(12) United States Patent
Han et al.

(10) Patent No.: US 11,248,986 B2
(45) Date of Patent: *Feb. 15, 2022

(54) MODULAR SHAKING TABLE TEST DEVICE WITH HEAVY LOAD CAPACITY AND EXTENSIBLE TEST FREQUENCY AND AREA

(71) Applicant: TIANJIN UNIVERSITY, Tianjin (CN)

(72) Inventors: Qinghua Han, Tianjin (CN); Mingjie Liu, Tianjin (CN); Hao Wu, Tianjin (CN); Yundong Shi, Tianjin (CN); Jinbao Ji, Tianjin (CN)

(73) Assignee: TIANJIN UNIVERSITY, Tianjin (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/013,760

(22) Filed: Sep. 7, 2020

(65) Prior Publication Data

US 2021/0262890 A1 Aug. 26, 2021

(30) Foreign Application Priority Data

Feb. 21, 2020 (CN) .......................... 202010105654.6

(51) Int. Cl.
*G01M 7/02* (2006.01)
(52) U.S. Cl.
CPC ............ *G01M 7/027* (2013.01); *G01M 7/022* (2013.01)

(58) Field of Classification Search
CPC ........ G01M 7/027; G01M 7/022; G01M 7/06; G01M 7/08; G01M 7/00
See application file for complete search history.

(56) References Cited

U.S. PATENT DOCUMENTS

| 5,724,893 A | * | 3/1998 | Lee | ......................... | G01M 7/06 108/137 |
| 2011/0239771 A1 | * | 10/2011 | Wu | ......................... | G01M 7/06 73/663 |
| 2015/0185108 A1 | * | 7/2015 | Baek | ...................... | G01M 7/02 73/669 |
| 2018/0106699 A1 | * | 4/2018 | He | ......................... | G01M 7/06 |

\* cited by examiner

*Primary Examiner* — Suman K Nath
(74) *Attorney, Agent, or Firm* — Dragon Sun Law Firm, PC; Jinggao Li, Esq.

(57) ABSTRACT

The present invention relates to a modular shaking table with heavy load capacity and extensible test frequency and area, comprising a shaking table body; the shaking table body is arranged in a building foundation in which a long-stroke groove is formed, long-stroke servo actuators are horizontally and vertically hinged in the modular shaking table; and an integration foundation is fixedly arranged on the upper end face of the shaking table body; an excitation platform is arranged in a short-stroke groove that is formed in the integration foundation, short-stroke servo actuators are horizontally and vertically hinged in the modular shaking table. The present invention is aimed at providing a large-scale and heavy-load modular shaking table that can meet the test requirements of realizing long stroke and high-frequency loading.

7 Claims, 2 Drawing Sheets

MODULAR SHAKING TABLE TEST DEVICE WITH HEAVY LOAD CAPACITY AND EXTENSIBLE TEST FREQUENCY AND AREA

TECHNICAL FIELD

The present invention relates to the technical field of earthquake simulation and in particular to a modular shaking table test device with heavy load capacity and extensible test frequency and area.

BACKGROUND OF THE PRESENT INVENTION

The shaking table tests are key simulation test methods for studying the failure and destruction mechanism of engineering structures under earthquake in the field of the earthquake engineering. The essential content of the shaking table tests is to reproduce earthquake actions. Therefore, the performance of the shaking table system is a necessary condition for conducting engineering earthquake simulation tests. During the engineering earthquake simulation tests, shaking table tests for a full-scale or large-scale engineering structure can actually reflect the failure and destruction of this engineering structure under earthquake actions. However, the shaking table test device is required to be capable of loading a full-scale or large-scale engineering structure test model. Studying causes of the failure and destruction of large-scale water control projects, which are important national infrastructures, is an important part of the ability to prevent and mitigate natural disasters. Since large-scale water control projects are huge in volume, it is impossible to conduct full-scale shaking table tests. In accordance with the large-scale principle, tests are conducted by a 1:80 scale. The shaking table test device is required to have large worktop size, high load-carrying ability, and high-frequency loading capacity not less than 40 Hz.

At present, it is difficult for the traditional shaking table systems to take both large stroke and high-frequency loading into consideration. That is, a shaking table test device capable of high-frequency loading has small worktop size, low load-carrying ability and short loading stroke, while a shaking table test device having large worktop size, high load-carrying ability and long loading stroke is incapable of high-frequency loading. Thus, it is unable to conduct large-scale engineering earthquake simulation tests for large-scale water control projects.

SUMMARY OF THE PRESENT INVENTION

To overcome the deficiencies of the prior art, the present invention provides a large-scale and heavy-load modular shaking table test device that can meet the test requirements of realizing long stroke and high-frequency loading.

For this purpose, the following technical solutions are employed in the present invention A modular shaking table test device with heavy load capacity and extensible test frequency and area is provided, comprising a shaking table body, wherein the shaking table body is arranged in a building foundation in which a long-stroke groove is formed, a plurality of long-stroke servo actuators are horizontally hinged between the periphery of the shaking table body and the sidewall of the long-stroke groove at an equal interval, a plurality of long-stroke servo actuators are vertically hinged between the bottom side of the shaking table body and the bottom of the long-stroke groove at an equal interval, and an integration foundation is fixedly arranged on the upper end face of the shaking table body; an excitation platform is arranged in a short-stroke groove that is formed in the integration foundation, a plurality of short-stroke servo actuators are horizontally hinged between the periphery of the excitation platform and the sidewall of the short-stroke groove at an equal interval, a plurality of short-stroke servo actuators are vertically hinged between the bottom side of the excitation platform and the bottom of the short-stroke groove at an equal interval; and both the short-stroke servo actuators and the long-stroke servo actuators are electrically connected to a motion controller.

Further, the stroke ratio of the long-stroke servo actuators to the short-stroke servo actuators is not less than 40, the maximum operating frequency of the long-stroke servo actuators is less than or equal to 25 Hz, the maximum operating frequency of the short-stroke servo actuators is greater than 40 Hz, and both the short-stroke servo actuators and the long-stroke servo actuators consist of hydraulic servo actuators.

Further, a plurality of isolation layers, which are arranged alternately to the short-stroke servo actuators, are arranged on the bottom side of the excitation platform, and each of the isolation layers is made of spring, air cushions or rubber pads.

Further, both the shaking table body and the excitation platform are welded into box-like cellular structures by steel plates.

Further, the shaking table body has a worktop area of greater than 250 m2, and the excitation platform has a worktop area of greater than 50 m2.

Further, the upper end face of the excitation platform is higher than the upper side of the integration foundation.

Further, the building foundation is made of concrete, the integration foundation is formed by welding by steel plates and has dense ribs, and both the building foundation and the integration foundation have a rectangular cross-section.

Compared with the prior art, the present invention has the following beneficial effects.

The shaking table test device of the present invention can be used for engineering earthquake simulation tests and can meet the large-scale and heavy-load requirements and also the requirements of realizing long stroke and high-frequency loading. The maximum operating frequency of the long-stroke servo actuators is less than or equal to 25 Hz, and the maximum operating frequency of the short-stroke servo actuators is greater than 40 Hz. It can provide a wider frequency adjustment range for earthquake simulation tests. By unloading the integration foundation from the shaking table body, the worktop area to be used for earthquake simulation tests can be increased. The frequency and available worktop area during the tests can be extensible.

41: long-stroke groove; and
42: long-stroke servo actuator.

DETAILED DESCRIPTION OF THE PRESENT INVENTION

The present invention will be described in detail below with reference to the accompanying drawings by embodiments.

Figure 1:
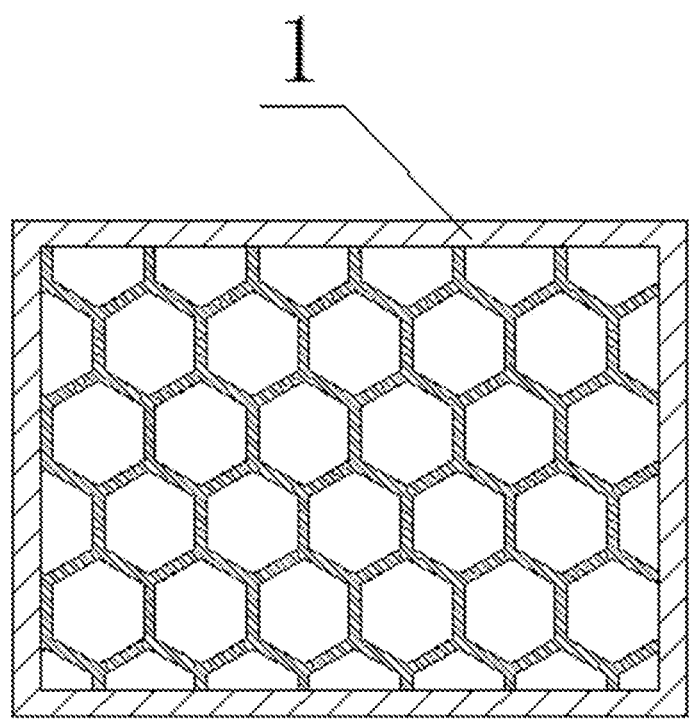
FIG. 1 is a structural diagram of the present invention.

As shown in FIG. 1, a modular shaking table test device with heavy load capacity and extensible test frequency and area is provided, comprising a shaking table body 1. The shaking table body 1 is arranged in a building foundation 4 in which a long-stroke groove 41 is formed. A plurality of long-stroke servo actuators 42 are horizontally hinged between the periphery of the shaking table body 1 and the sidewall of the long-stroke groove 41 at an equal interval. A plurality of long-stroke servo actuators 42 are vertically hinged between the bottom side of the shaking table body 1 and the bottom of the long-stroke groove 41 at an equal interval. An integration foundation 3 is fixedly arranged on the upper end face of the shaking table body 1. An excitation platform 2 is arranged in a short-stroke groove 31 that is formed in the integration foundation 3. A plurality of short-stroke servo actuators 32 are horizontally hinged between the periphery of the excitation platform 2 and the sidewall of the short-stroke groove 31 at an equal interval. A plurality of short-stroke servo actuators 32 are vertically hinged between the bottom side of the excitation platform 2 and the bottom of the short-stroke groove 31 at an equal interval. A plurality of isolation layers 33, which are arranged alternately to the short-stroke servo actuators 32, are arranged on the bottom side of the excitation platform 2. In this embodiment, each of the isolation layers 33 is made of rubber pads. The upper end face of the excitation platform 2 is higher than the upper side of the integration foundation 3. Both the short-stroke servo actuators 32 and the long-stroke servo actuators 42 are electrically connected to a motion controller. The stroke ratio of the long-stroke servo actuators 42 to the short-stroke servo actuators 32 is not less than 40, the maximum operating frequency of the long-stroke servo actuators 42 is less than or equal to 25 Hz, the maximum operating frequency of the short-stroke servo actuators 32 is greater than 40 Hz, and both the long-stroke servo actuators 42 and the short-stroke servo actuators 32 consist of hydraulic servo actuators. The building foundation 4 is made of concrete, the integration foundation 3 is made of welded steel plates and has dense ribs inside, and both the building foundation 4 and the integration foundation 3 have a rectangular cross-section.

Figure 2:
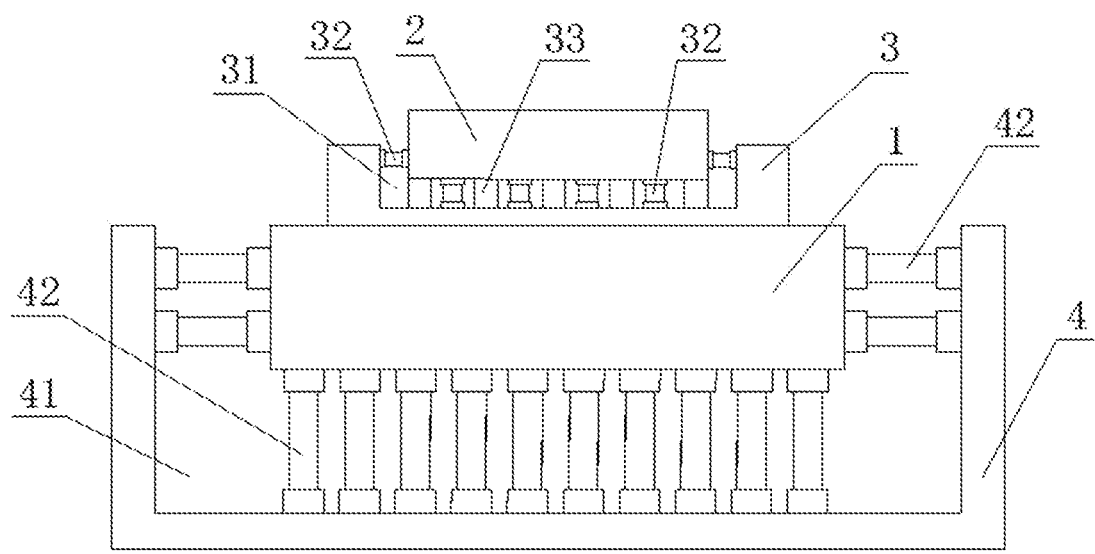
FIG. 2 is a cross-sectional view of the shaking table body in the present invention,
in which:
1: shaking table body;
2: excitation platform;
3: integration foundation;
4: building foundation;
31: short-stroke groove;
32: short-stroke servo actuator;
33: isolation layer.

As shown in FIG. 2, both the shaking table body 1 and the excitation platform 2 are welded into box-like cellular structures by steel plates, which guarantees the strength and rigidity of the shaking table body 1 and the excitation platform 2. The shaking table body 1 has a worktop area of greater than 250 m$^2$, and the excitation platform 2 has a worktop area of greater than 50 m$^2$. These large worktop areas provide an enough worktop for large-scale engineering earthquake simulation tests.

Due to arrangement of the long-stroke servo actuators, some of the long-stroke servo actuators 42, which move horizontally, are arranged on the periphery of the shaking table body 1, and others, which move vertically, are arranged on the bottom of the shaking table body 1, the test device of the present invention can meet the long-stroke and low-frequency loading requirements during the earthquake simulation tests. Due to arrangement of the short-stroke servo actuators, some of the short-stroke servo actuators 32, which move horizontally, are arranged on the periphery of the excitation platform 2, and others, which move vertically, are arranged on the bottom of the excitation platform 2, the test device of the present invention can meet the short-stroke and high-frequency loading requirements during the tests. Both the shaking table body 1 and the excitation platform 2 are hinged to the actuators by ball joints or by pin shafts. The isolation layers 33, which are arranged alternately to the short-stroke servo actuators 32 and on the bottom side of the excitation platform 2, can minimize the interference of vibration between the shaking table body 1 and the excitation platform 2. Both the building foundation 4 made of concrete and the integration foundation 3 made of welded steel plates have high strength and rigidity. The integration foundation 3 further has dense ribs and thus it can adapt to the high-frequency operating state of the short-stroke servo actuators 32. Steel plates are fixed at an end, which is hinged to the servo actuators, of each of the integration foundation 3 and the building foundation 4. Such an arrangement can further enable the integration foundation 3 and the building foundation 4 to withstand the motion of the servo actuators.

The connection of both the short-stroke servo actuators 32 and the long-stroke servo actuators 42 can be controlled by a motion controller that is arranged outside the shaking table body 1. The motion controller may be a multi-channel motion controller ServoTest Pulsar or MTS 469D, which controls the long-stroke servo actuators 42 for the shaking table body 1 and the short-stroke servo actuators 32 for the excitation platform 2, respectively, to realize the motion of the two worktops in multiple degrees of freedom. After the loading of excitation by frequency division method, the shaking table body 1 will do long-stroke low-frequency motion, and the excitation platform 2 will do short-stroke high-frequency motion in contrast to the shaking table body 1. In this way, the excitation platform 2 has both high-frequency and low-frequency seismic waves. Accordingly, seismic waves in a higher frequency band can be realized. When a larger worktop area is needed, the integration foundation 3 may be unloaded from the shaking table body 1. This can increase the worktop area to be used for earthquake simulation tests.

The forgoing description is just a preferred embodiment of the present invention and is not intended to limit the present invention. Any modifications, equivalent replacements and improvements made within the spirit and principle of the present invention shall be included within the protection scope of the present invention.

The foregoing description of the exemplary embodiments of the present invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A modular shaking table test device with heavy load capacity and extensible test frequency and area, comprising: a shaking table body, wherein
   the shaking table body being arranged in a building foundation in which a long-stroke groove is formed;
   a first plurality of long-stroke servo actuators being horizontally hinged between the periphery of the shaking table body and the sidewall of the long-stroke groove at an equal interval;
   a second plurality of long-stroke servo actuators being vertically hinged between the bottom side of the shaking table body and the bottom of the long-stroke groove at an equal interval;
   an integration foundation being fixedly arranged on the upper end face of the shaking table body;
   an excitation platform being arranged in a short-stroke groove that is formed in the integration foundation;
   a first plurality of short-stroke servo actuators being horizontally hinged between the periphery of the excitation platform and the sidewall of the short-stroke groove at an equal interval;
   a second plurality of short-stroke servo actuators being vertically hinged between the bottom side of the excitation platform and the bottom of the short-stroke groove at an equal interval; and
   both the short-stroke servo actuators and the long-stroke servo actuators being electrically connected to a motion controller.

2. The modular shaking table test device with heavy load capacity and extensible test frequency and area according to claim 1, wherein the stroke ratio of the long-stroke servo actuators to the short-stroke servo actuators is not less than 40, the maximum operating frequency of the long-stroke servo actuators is less than or equal to 25 Hz, the maximum operating frequency of the short-stroke servo actuators is greater than 40 Hz, and both the short-stroke servo actuators and the long-stroke servo actuators consist of hydraulic servo actuators.

3. The modular shaking table test device with heavy load capacity and extensible test frequency and area according to claim 1, wherein a plurality of isolation layers, which are arranged alternately to the short-stroke servo actuators, are arranged on the bottom side of the excitation platform, and each of the isolation layers is made of spring, air cushions or rubber pads.

4. The modular shaking table test device with heavy load capacity and extensible test frequency and area according to claim 1, wherein both the shaking table body and the excitation platform are welded into box-like cellular structures by steel plates.

5. The modular shaking table test device with heavy load capacity and extensible test frequency and area according to claim 4, wherein the shaking table body has a worktop area of greater than 250 $m^2$, and the excitation platform has a worktop area of greater than 50 $m^2$.

6. The modular shaking table with heavy load capacity and extensible test frequency and area according to claim 1, wherein the upper end face of the excitation platform is higher than the upper side of the integration foundation.

7. The modular shaking table with heavy load capacity and extensible test frequency and area according to claim 1, wherein the building foundation is made of concrete, the integration foundation is made of welded steel plates and has dense ribs, and both the building foundation and the integration foundation have a rectangular cross-section.

* * * * *